(12) United States Patent
Sugihashi et al.

(10) Patent No.: US 7,039,043 B2
(45) Date of Patent: May 2, 2006

(54) VOICE DATA COMMUNICATION SYSTEM

(75) Inventors: Hideyuki Sugihashi, Osaka (JP); Mitsuru Tanida, Osaka (JP); Hideaki Shimizu, Osaka (JP); Osamu Shimada, Osaka (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 10/043,741

(22) Filed: Jan. 9, 2002

(65) Prior Publication Data

US 2003/0103512 A1 Jun. 5, 2003

(30) Foreign Application Priority Data

Aug. 24, 2001 (JP) .............................. 2001-254167

(51) Int. Cl.
*H04L 12/66* (2006.01)
*H04L 12/28* (2006.01)
*H04L 12/56* (2006.01)

(52) U.S. Cl. ...................... 370/355; 370/356; 370/401

(58) Field of Classification Search ........ 370/352–356, 370/401, 465, 466
See application file for complete search history.

(56) References Cited

U.S. PATENT DOCUMENTS 6,628,644 B1 * 9/2003 Nelson et al. .............. 370/352

6,680,952 B1 * 1/2004 Berg et al. .................. 370/467

* cited by examiner

*Primary Examiner*—Chau Nguyen
*Assistant Examiner*—Neeraj Bhatia
(74) *Attorney, Agent, or Firm*—Katten Muchin Rosenman LLP (57) ABSTRACT

In a voice data communication system comprising a switchboard for switching lines, a network, interworking units for interworking a protocol on the network with a protocol for a line switching, and IP extension terminals connected to the interworking units through the network, a switchboard notifies a communication between interworking units to the interworking units when recognizing the communication between the interworking units, which are provided corresponding to each of IP extension terminals, and establish a relay route to the interworking unit according to a notification from the switchboard and establish a voice data packet route to a route between the IP extension terminals through the network by using the relay route in response to a route establishment request from the IP extension terminals accommodated, or when the interworking unit is a single and the notification is received from the switchboard, establish a voice data packet route to a route between the IP extension terminals through the network according to a route establishment request from the IP extension terminal accommodated.

7 Claims, 10 Drawing Sheets

MESSAGE FORMAT BETWEEN SWITCHBOARD & GW

- CALL REFERENCE
- MESSAGE CLASSIFICATION
  (SESSION INITIALIZE/
  ADDITIONAL INFORMATION/···)
- INFORMATION ELEMENT
- NON-STANDARD INFORMATION
  ELEMENT

⌠50
- INFORMATION ELEMENT
  CLASSIFICATION
  (NON-STANDARD INFORMATION)
- CONNECTING DESTINATION GW IP
  ADDRESS
- CONNECTING DESTINATION CALL
  REFERENCE
- CALLING/CALLED
  CLASSIFICATION
  (CALLING/CALLED)
- CONNECTION CHANGEOVER
  CLASSIFICATION
  (CHANGEOVER/CHANGEBACK)

FIG.9

MESSAGE FORMAT OF INTER-GW ABILITY EXCHANGE

| IP HEADER |
| TCP HEADER |
| - MESSAGE CLASSIFICATION<br>  (ABILITY INFORMATION<br>  SETTING REQUEST)<br>- NON-STANDARD DATA<br>  (CONNECTING SOURCE CALL<br>  REFERENCE)<br>- CODER CLASSIFICATION |

FIG.10

| CONDITION OF DATA SETTING EXAMPLE ||
|---|---|
| DATA REGISTERED STATICALLY | DATA REGISTERED DYNAMICALLY |
| · IP EXTENSION TERMINAL 4a : EXTENSION NO. = 3000, IP ADDRESS = 192.168.1.100<br>· IP EXTENSION TERMINAL 4b : EXTENSION NO. = 3100, IP ADDRESS = 192.168.1.200<br>· GW 3a : IP ADDRESS =192.168.1.10, ACCOMMODATING IP EXTENSION TERMINAL 4a<br>· GW 3b : IP ADDRESS =192.168.1.20, ACCOMMODATING IP EXTENSION TERMINAL 4b | · CALL REFERENCE =100 BETWEEN GW 3a & IP EXTENSION TERMINAL 4a<br>· CALL REFERENCE =10 BETWEEN GW 3a & SWITCHBOARD 1<br>· MEDIA CONTROLLING TCP CONNECTION NO.=16 ABOUT GW 3a<br>· RELAYING TCP CONNECTION NO.=18 ABOUT GW 3a<br>· CALL REFERENCE =200 BETWEEN GW 3b & IP EXTENSION TERMINAL 4b<br>· CALL REFERENCE =20 BETWEEN GW 3b & SWITCHBOARD 1<br>· MEDIA CONTROLLING TCP CONNECTION NO. = 17 ABOUT GW 3b<br>· RELAYING TCP CONNECTION NO. =19 ABOUT GW 3b<br>· VOICE DATA PACKET ADDRESS = IP: 192.168.1.100 + UDP PORT 13000 ABOUT IP EXTENSION TERMINAL 4a<br>· VOICE DATA PACKET ADDRESS = IP: 192.168.1.200+ UDP PORT 13100 ABOUT IP EXTENSION TERMINAL 4b |

VOICE DATA COMMUNICATION SYSTEM

BACKGROUND OF THE INVENTION

1. Field of the Invention

The present invention relates to a voice data communication system, and in particular to a voice data communication system accommodating an IP telephone network in which a VoIP (voice over IP) technology enabling a voice call through a LAN/WAN (Local Area Network/Wide Area Network) is used.

2. Description of the Related Art

Figure 13:
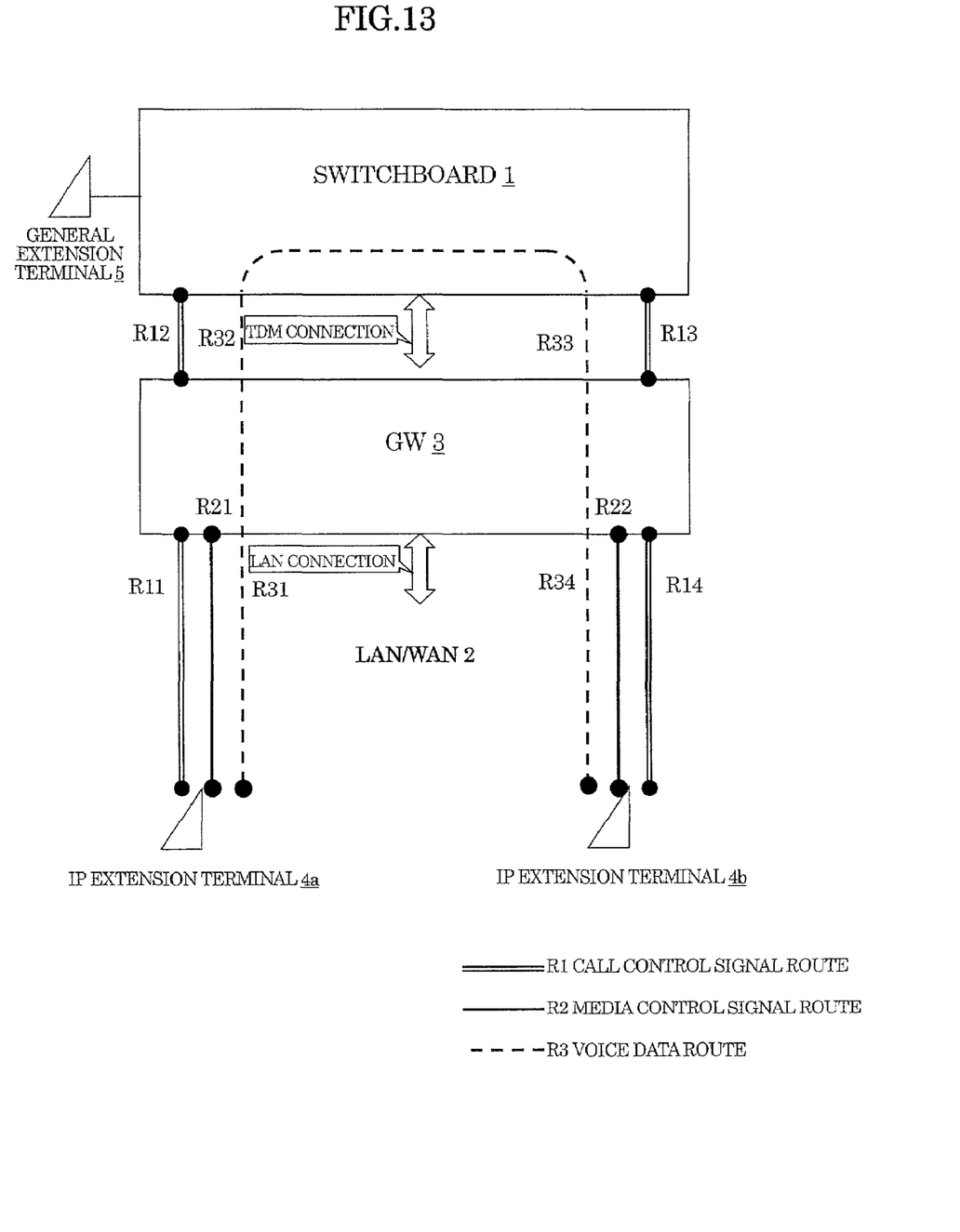
FIG. 13 is a block diagram showing an arrangement of a prior art voice data communication system.

FIG. 13 shows an arrangement of a prior art voice data communication system. The voice data communication system accommodating an IP telephone network which applies thereto an already-existing line switching network and a VoIP technology, shown in this prior art example, is composed of a switchboard 1, a LAN or a WAN (hereinafter, generally referred to as LAN for simplifying descriptions) 2, a gateway (hereinafter, occasionally abbreviated as GW) 3 which interworks a protocol on the LAN or WAN 2 with a protocol for a line switching, IP extension terminals 4a and 4b (hereinafter, occasionally represented by a reference numeral "4"), and a general extension terminal 5.

The IP extension terminal 4 is an apparatus, connected to the LAN 2 instead of an existing telephone line, having functions of encoding a voice signal and making it a voice data packet (UDP packet) for the transmission, or of decoding a received voice data packet for the reproduction.

Since the above-mentioned voice data communication system includes a configuration in which the IP extension terminal 4a or 4b communicates with the general extension terminal 5 by telephone, a decision processing of a called extension terminal and a line switching processing are all performed by the switchboard 1.

Therefore, even if it is a communication between the IP extention terminals 4a and 4b connected to each other with the LAN 2, the voice data packet cannot be directly transmitted/received between the IP extention terminals, so that the voice data packet must be transmitted through the gateway 3 and the switchboard 1.

Hereinafter, details of the connecting operation between the IP extension terminals 4a and 4b accommodated in the gateway 3 will be described referring to FIG. 13.

The switchboard 1 manages which of the gateway 3 accommodates the IP extension terminals 4a and 4b, and determines a called extension terminal based on call control signal information from a calling extension terminal. In case this called extension terminal is an IP extension terminal, the switchboard 1 performs a called processing to the gateway 3.

The gateway 3 performs a processing of tying a logical line of the LAN 2 on the side of the IP extension terminals 4a and 4b with a TDM (Time Division Multiplexing) line on the switchboard 1 side. There are a call control signal route R1, a media control signal route R2, and a voice data route R3 for a logical line on the LAN 2 side, as shown in FIG. 13.

[Establishment of Call Control Signal Route R1]

The switchboard 1 and the gateway 3 establish routes R12 and R13 within the call control signal route R1 by using an existing, individual signal line etc. established in the TDM line.

The gateway 3 and the IP extension terminals 4a, 4b are connected through the LAN 2, so that the call control is carried out by a TCP connection with a high reliability. The IP extension terminals 4a and 4b have preliminarily known destination information (IP address+TCP port) for a call control signal route establishment of the gateway 3 in which the IP extension terminals 4a and 4b themselves are accommodated, and the gateway 3 has preliminarily known destination information (IP address+TCP port) of the accommodating IP extension terminals.

The calling IP extension terminal 4a establishes a TCP connection for the gateway 3. The IP extension terminal 4a edits called No. information of the IP extension terminal 4b to a session initialize message to be transmitted to the gateway 3 through the TCP connection (R11 in FIG. 13).

The gateway 3 transmits the received session initialize message to the call control signal route R12.

The switchboard 1 having received the session initialize message through the call control signal route R12 recognizes that the called party IP extension terminal 4b is accommodated in the gateway 3 from the called party No. information, and transmits the session initialize message to the gateway 3 (R13 in FIG. 13).

The gateway 3 establishes the TCP connection of a call control signal route R14 for the called IP extension terminal 4b.

Hereafter, the IP extension terminals 4a and 4b transmit/receive a call control signal message through the TCP connection of the LAN line and the call control signal route R1 on the TDM line, thereby leading to a call state.

[Establishment of Voice Data Route R3]

Routes R32 and R33 forming the voice data route R3 on the TDM line side are determined by the call control message between the switchboard 1 and the gateway 3.

Voice data routes R31 and R34 on the LAN 2 side are established by using the media control signal route R2. The reason is that a voice data compression-coding rule used is required to be determined since voice data compression-coding is generally performed for the voice data packet on LAN 2, and that the destination information (IP address+UDP port No.) to transmit/receive the voice data packet is variable. Hereinafter, how to establish the media control signal route R2 will be described.

The IP extension terminal 4a establishes a media controlling TCP connection between the IP extension terminal 4a and the gateway 3, determines the voice data compression-coding rule by using the TCP connection, and notifies the destination information (IP address+UDP port No.) for a voice data packet reception to each other.

The IP extension terminals 4a and 4b or the gateway 3 transmits the voice data packet on the destination information of the destination notified by the media control signal routes R21 and R22. Thus, a bi-directional voice data packet route R3 is established between the IP extension terminals 4a and 4b.

The IP extension terminals 4a and 4b compression-code the inputted voice signal, and make the encoded voice data a UDP packet (voice data packet) to be transmitted. Also, the IP extension terminals 4a and 4b decompression-decode the voice data of the received voice data packet, and reproduce the voice signal.

The gateway 3 transmits the PCM data in which the voice data of the received voice data packet are decompression-decoded, to the voice data route R32 of the TDM line. Also, the PCM data received from the voice data route R33 of the TDM line are compression-coded, and the encoded voice data are made the UDP packet to be transmitted.

The switchboard 1 inserts the PCM data from the calling party channel of the voice data route R32 into the called party channel of the voice data route R33, and inserts the PCM data from the called party channel into the calling party channel.

Thus, there have been following problems in the prior art since the voice data route R3 passes through the gateway 3 and the switchboard 1 in spite of a call between the IP extension terminals 4a and 4b.

The first problem is that a delay time increases due to an assembly/disassembly of the voice data into the IP packet in the gateway 3.

When the voice data transformed to the IP packet on nonguaranteed QoS (Quality of Service) network (LAN/WAN) are transmitted, it is necessary to absorb a dispersion (fluctuation) of the transmission delay in the network on the called party, so that the called party usually accumulates the voice data packet for a predetermined time to be decoded.

Delay a speaker feels for a voice packet's arrival can be decreased if the accumulating time is shortened. However in that case, a packet delayed by more than the accumulating time cannot be decoded, resulting in deteriorated voice quality. Namely, a delay time for absorbing the fluctuation must be accepted to some extent as a result of a trade-off with the voice quality.

A transmission line of an IP base is originally inferior to a TDM transmission line and an ATM transmission line in a delay time, so that a simple addition of a delay time of fluctuation absorption causes a worse influence upon the call quality.

The second problem is that the voice quality is deteriorated since the compression-coding and the decompression-decoding of the voice data are performed when passing through the gateway 3.

A voice waveform generally distorts by a quantization noise in a voice data compression-coding. The noise is little in the inputted voice signal, when the distortion is allowable. However, when the voice signal to which the quantization noise is added is inputted, the voice quality is largely deteriorated. Increased frequency of the compression-coding and decompression-decoding of the voice data further deteriorates the voice quality.

The third problem is that the voice data packet of the twice amount is transmitted/received compared with the case where the voice data packet is directly transmitted/received between the IP extension terminals, thereby decreasing a band use efficiency of the network.

SUMMARY OF THE INVENTION

It is accordingly an object of the present invention to provide a voice data communication system which comprises a switchboard for switching lines, a network, interworking units for interworking a protocol on the network with a protocol for line switching, and IP extension terminals connected to the interworking units through the network, in order to solve the above-mentioned three problems, that is, shortening of a delay time, and decreasing of an encoding/decoding frequency and a data amount.

The present invention, plain and simple, aims to solve the above-mentioned three problems at the same time by transmitting/receiving a voice data packet directly between the IP extension terminals through the network such as LAN/WAN.

Therefore, in a voice data communication system according to the present invention (1), a switchboard has a recognition unit for recognizing a communication to be made between the interworking units, and an notification unit for notifying the communication to the interworking units when the communication is recognized, and each of the interworking units, provided corresponding to each of the IP extension terminals, has a relay route establishing unit for establishing a relay route to the interworking unit according to a notification from the switchboard, and a route establishing unit for establishing a voice data packet route to a route between the IP extension terminals through the network by using the relay route in response to a route establishment request from the IP extension terminals accommodated.

The means for solving the problems by this invention (1) will now be described referring to FIG. 1. It is to be noted that the above-mentioned interworking units will be described by taking a gateway as an example.

A switchboard 1 has an inter-GW communication recognizing unit 6 and an inter-GW communication notifying unit 7. Also, gateways 3a and 3b are respectively provided corresponding to IP extension terminals 4a and 4b, and respectively have relay route establishing units 8a and 8b, and voice data packet route establishing units 9a and 9b. The switchboard 1, the gateways 3a and 3b, the LAN 2, and the IP extension terminals 4a and 4b are connected in the same way as the prior art shown in FIG. 13.

In operation, when the inter-GW communication recognizing unit 6 recognizes an inter-GW communication based on a call control signal through a call control signal route R1 (R11, R12) in the switchboard 1, the inter-GW communication notifying unit 7 notifies, in response to the recognition, the information for identifying a call of a connecting destination to the gateways 3a and 3b.

The gateways 3a and 3b to which the inter-GW communication is notified establish a relay route R23 composing a media control signal route R2 between the connecting destination gateways 3b and 3a by the respective inter-GW relay route establishing units 8a and 8b.

When receiving, for example, a route establishing request that is an ability information setting message from the IP extension terminals 4a and 4b accommodated in the gateways 3a and 3b, the voice data packet route establishing units 9a and 9b transmit/receive a media control signal through the relay route R23 to establish a voice data packet route in the route R3 between the IP extension terminals through LAN 2.

Thus, in the present invention (1), even if the IP extension terminals 4a and 4b are accommodated in the other gateways 3a and 3b, without the gateways 3a and 3b do not draw in the voice data packet route to itself, but directly transmit/receive the voice data between the IP extension terminals 4a and 4b, that is, the shortest route, thereby enabling the above-mentioned problems to be solved.

Also, in a voice data communication system according to the present invention (2) a switchboard has a recognition unit for recognizing a communication to be made between the interworking units, and an notification unit for notifying the communication to the interworking units when the communication is recognized, and each of the interworking units has a route establishing unit for establishing a voice data packet route to a route between the IP extension terminals through the network according to a route establishment request from the IP extension terminal accommodated when the notification from the switchboard is received.

Figure 2:
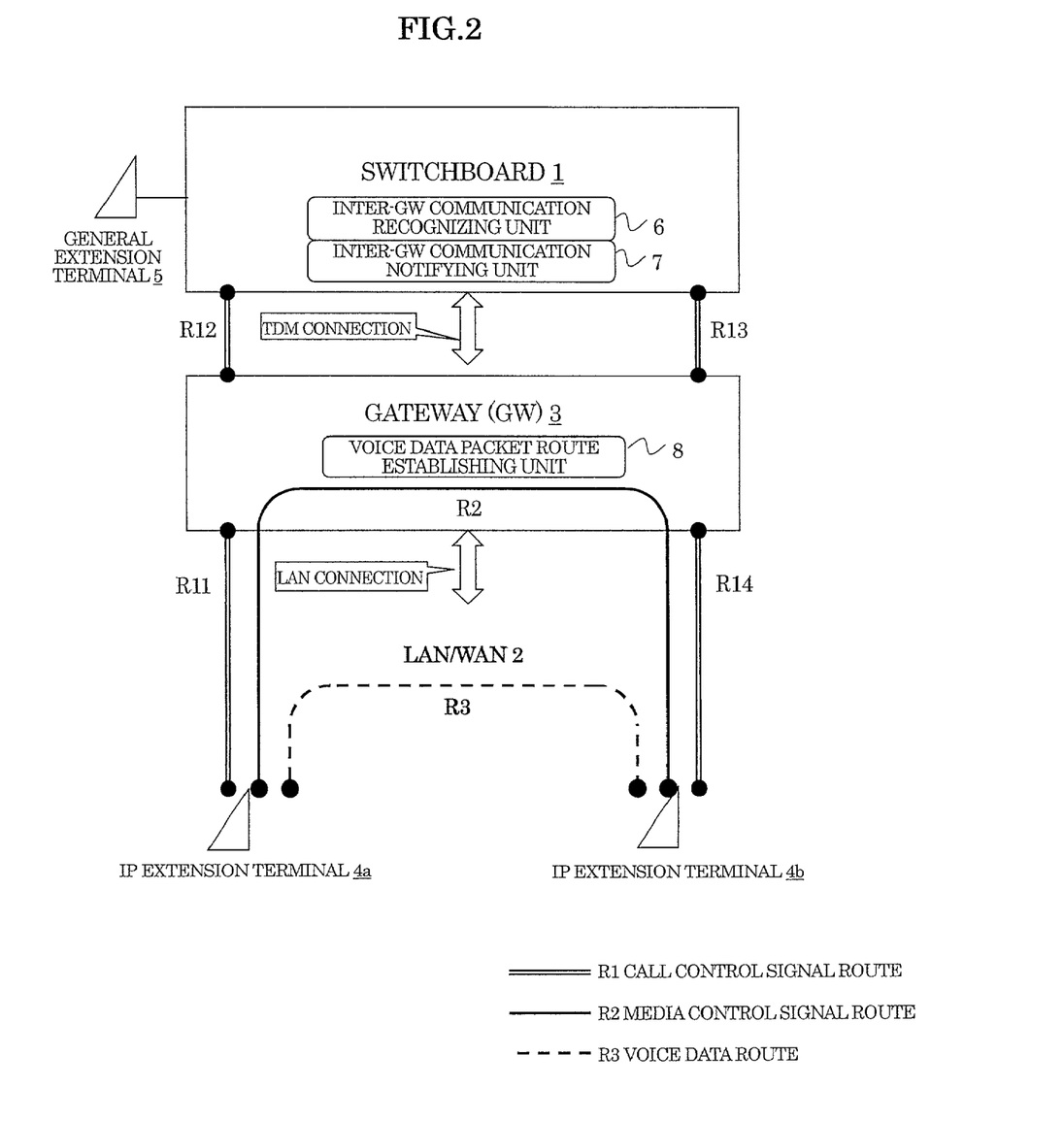
FIG. 2 is a block diagram illustrating a principle of a voice data communication system according to the present invention (2)

The means for solving the problems by this invention (2) will now be described referring to FIG. 2.

The difference between the invention (2) and the above-mentioned invention (1) is that the gateway 3 is not divided into the gateways 3a and 3b, accommodates both of the IP extension terminals 4a and 4b, but has only the voice data packet route establishing unit 8.

In the characteristic operation of the invention (2), the gateway 3 to which the inter-GW communication is notified relays the media control signal received from the IP extension terminal 4a or 4b through the media control signal route R2 to the IP extension terminal 4b or 4a at the connecting destination by the voice data packet route establishing unit 8.

Therefore, the IP extension terminals 4a and 4b come into the conversation state by the voice data route R3 only through the LAN 2.

Thus, in the present invention (2), the gateway 3 transmits/receives the voice data packet directly between the IP extension terminals 4a and 4b, that is the shortest route, without drawing in the voice data packet route to itself, thereby enabling the above-mentioned problems to be solved.

It is to be noted that when a hooking operation is performed in any of the IP extension terminals, the recognition unit of the switchboard may recognize the hooking operation through the interworking unit, and the notification unit may notify the hooking operation to the voice data packet route establishing units of the interworking units, whereby the voice data packet route establishing units may disconnect the relay route and establish a new voice data packet route between the IP extension terminals respectively accommodated in the voice data packet route establishing units.

Furthermore, the recognizing unit may recognize the communication between the interworking units by predetermined data preliminarily registered and data determined at a time of a session initialization.

BRIEF DESCRIPTION OF THE DRAWINGS

Throughout the figures, like reference numerals indicate like or corresponding components.

DESCRIPTION OF THE EMBODIMENTS

Figure 3:
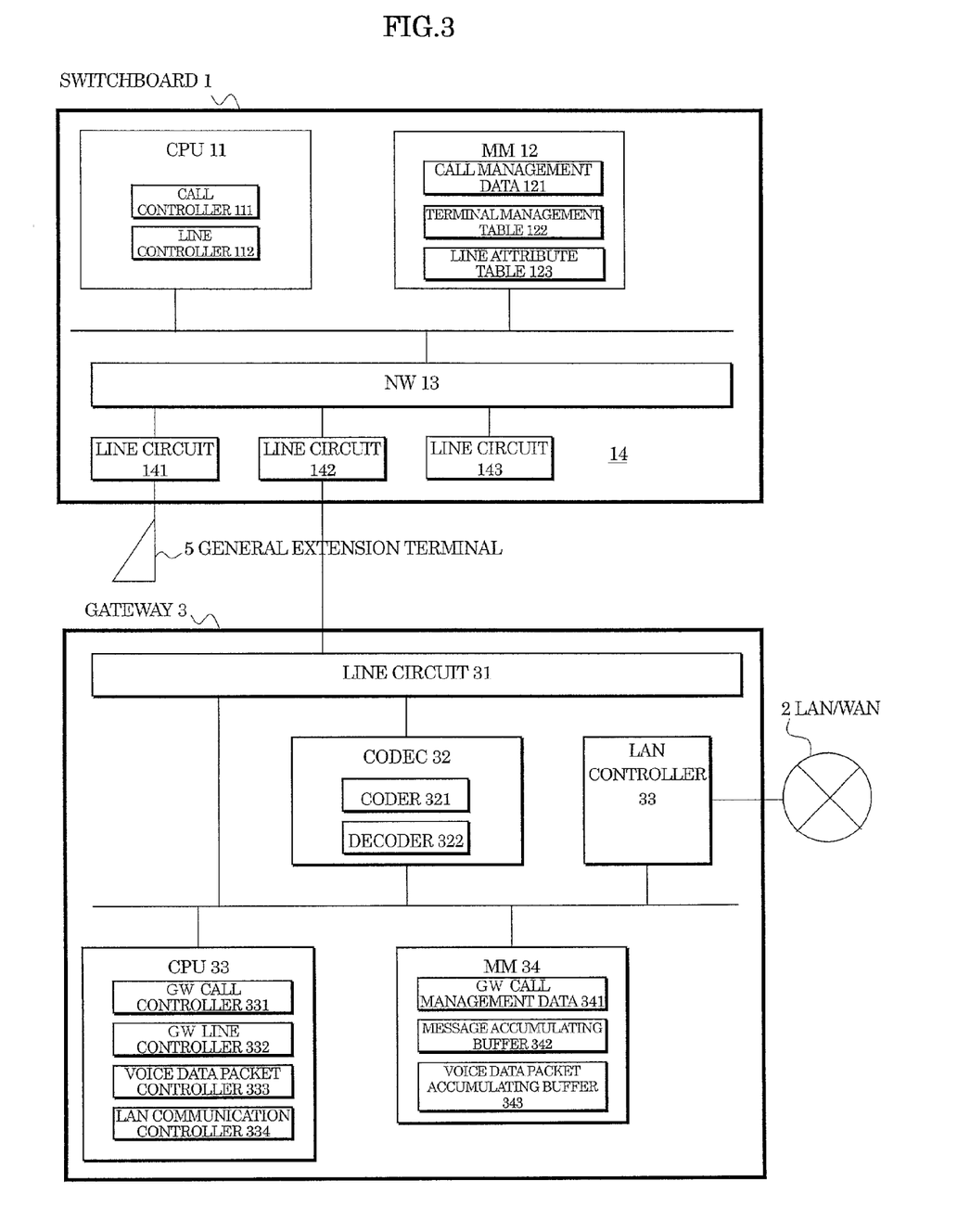
FIG. 3 is a functional block diagram showing an embodiment of a voice data communication system according to the present invention.

FIG. 3 shows an embodiment of a voice data communication system according to the present invention. In this embodiment, the switchboard 1 is composed of a CPU 11, a main memory (hereinafter, abbreviated as MM) 12, a network (NW) 13, and line circuits 141–143 (occasionally, represented by a reference numeral "14").

Figure 1:
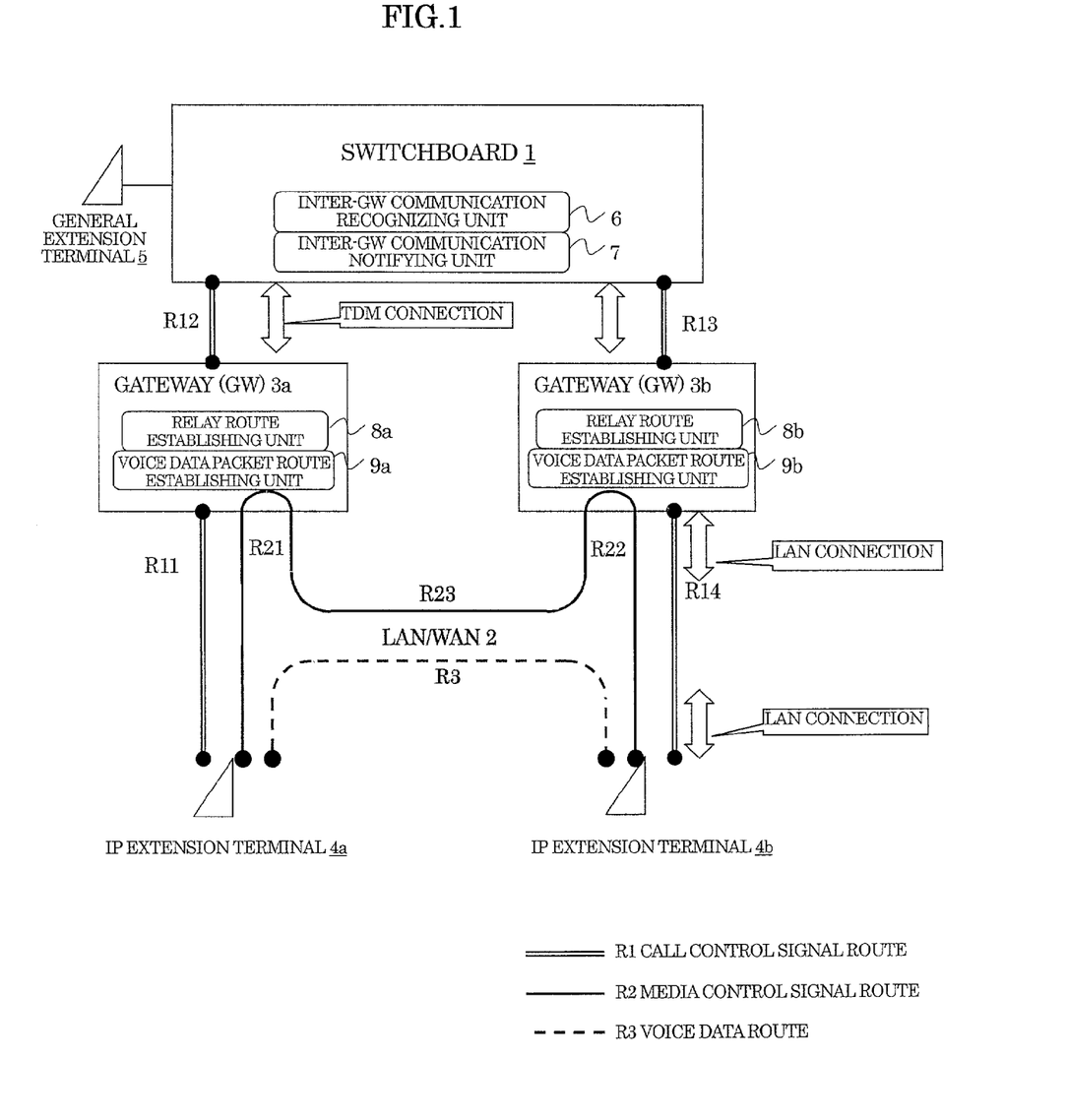
FIG. 1 is a block diagram illustrating a principle of a voice data communication system according to the present invention (1)
Figure 4:
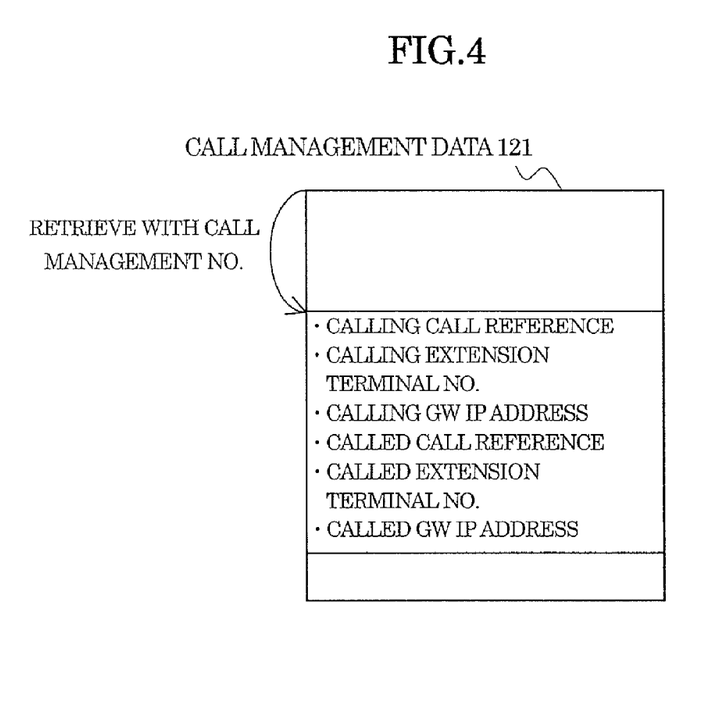
FIG. 4 is a detailed example of call management data 121 used in an embodiment of a voice data communication system according to the present invention.
Figure 5:
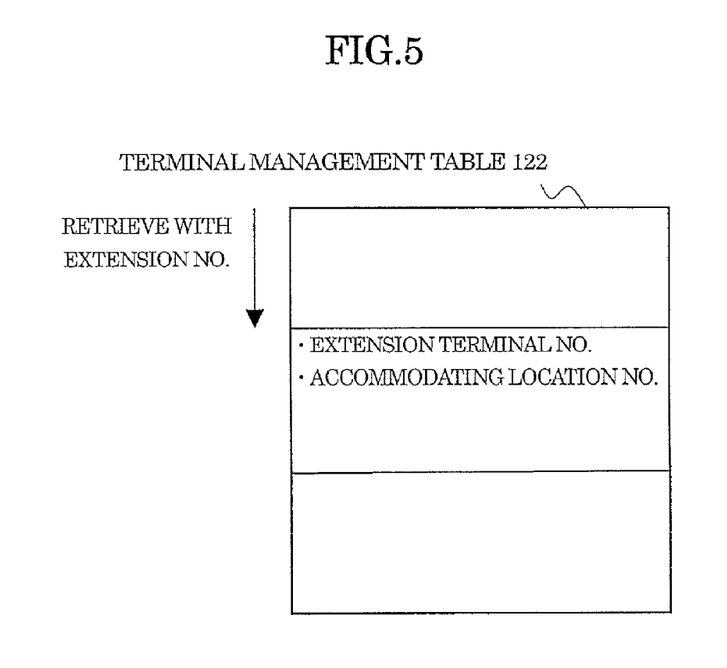
FIG. 5 is a detailed example of a terminal management table 122 used in an embodiment of a voice data communication system according to the present invention.
Figure 6:
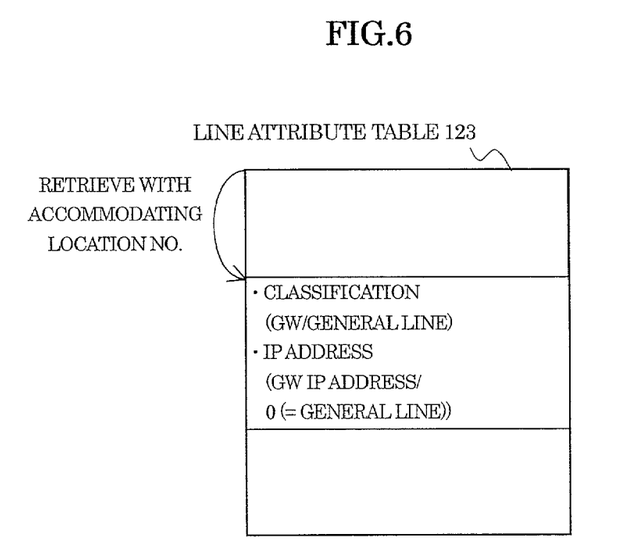
FIG. 6 is a detailed example of a line attribute table 123 used in an embodiment of a voice data communication system according to the present invention.

The CPU 11 and the MM 12 compose the inter-GW communication recognizing unit 6 and the inter-GW communication notifying unit 7 in FIG. 1. Specifically, the CPU 11 has a call controller 111 and a line controller 112. The MM 12 has, as shown in FIG. 4, call management data 121 composed of "a calling party call reference", "a calling party extension No.", "a calling party GW IP address", "a called party call reference", "a called party extension No.", and "a called party GW IP address", terminal management data 122, as shown in FIG. 5, composed of "an extension No." and "an accommodating location No.", and a line attribute table 123 composed of "a classification" and "an IP address", as shown in FIG. 6.

Also, the gateway 3a or 3b as an interworking unit is composed of a line circuit 31 connected to a line circuit 142 of the switchboard 1, a CODEC 32, a LAN controller 33, a CPU 33, and an MM 34. The CPU 33 and the MM 34 compose the relay route establishing unit 8a and the voice data packet route establishing unit 9a. Specifically, the CPU 33 comprises a GW call controller 331, a GW line controller 332, a voice data packet controller 333, and a LAN communication controller 334.

Figure 8:
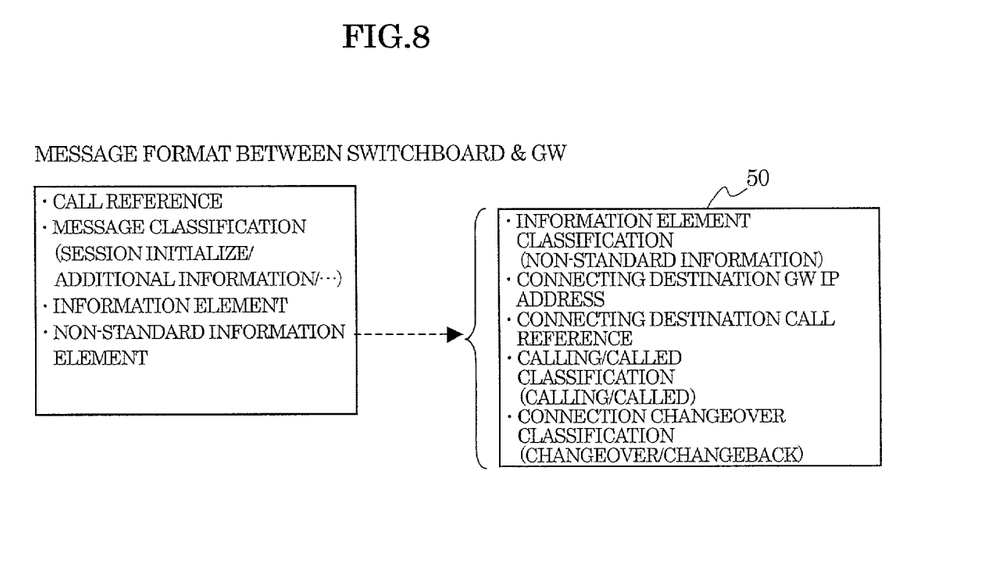
FIG. 8 is a format diagram of a non-standard information element of a message between a switchboard and a gateway, used in an embodiment of a voice data communication system according to the present invention.
Figure 9:
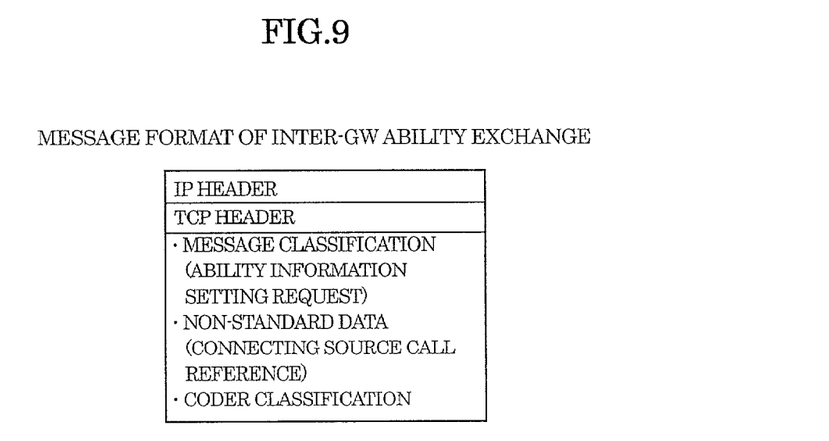
FIG. 9 is a format diagram of an inter-GW ability exchanging message used in an embodiment of a voice data communication system according to the present invention.

Also, the MM 34, as for the embodiment, comprises GW call management data composed of "a TDM side call reference", "a LAN side call reference", "a connecting destination GW IP address", "a connecting destination call reference", "an IP address of an accommodated IP extension terminal", "a media controlling TCP connection No.", "a voice data packet transmission address", and "a relaying TCP connection No.", a session initialize message between the switchboard and the gateway as shown in FIG. 8 described later, a message accumulating buffer 342 for accumulating an inter-GW ability exchanging message as shown in FIG. 9, and a voice data packet transmission/reception buffer 343 for absorbing a dispersion in the network.

It is to be noted that the CODEC 32 has a coder 321 for compression-coding the voice signal, and a decoder 322 for decompression-decoding the voice data. The LAN controller 33 is connected to the LAN/WAN (hereinafter, generally referred to as LAN) 2.

Figure 10:
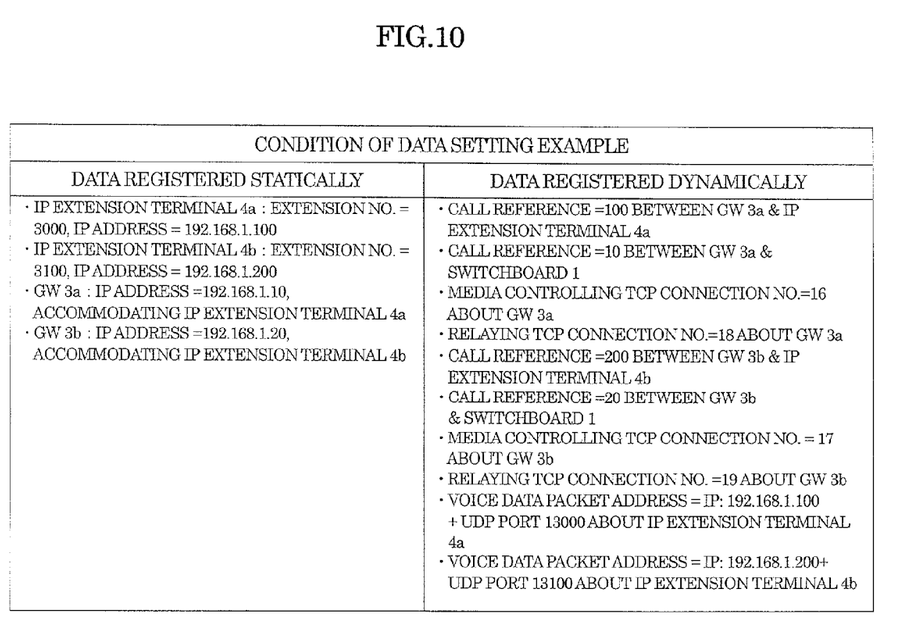
FIG. 10 is a setting example of call management data and GW call management data used in an embodiment of a voice data communication system according to the present invention.

Also, the setting example of each data preliminarily registered is shown in FIG. 10.

Figure 11:
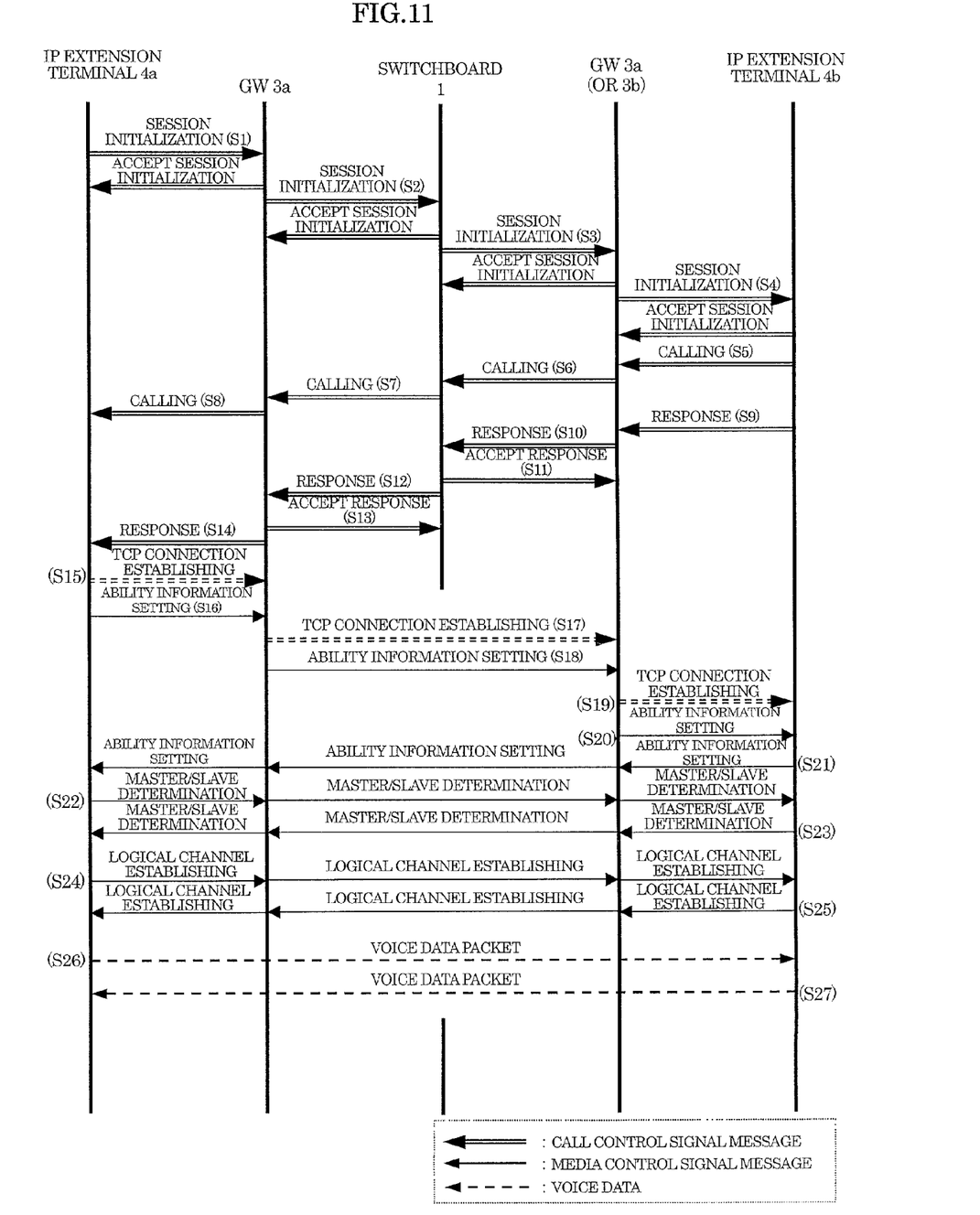
FIG. 11 is a sequence diagram (direct route between extension terminals) used in an embodiment of a voice data communication system according to the present invention.

FIG. 11 shows an example of a message sequence when the IP extension terminal 4a calls the IP extension terminal 4b, and the IP extension terminal 4b responses to it in the embodiment shown in FIG. 3. The message sequence of ITU-T H.323 is used between the IP extension terminal 4 and the gateway 3, and the message sequence of ITU-T Q931 is used between the gateway 3 and the switchboard 1.

The present invention (1) will now be firstly described according to this arrangement. It is to be noted that in this case, the gateway 3 is, as shown in FIG. 2, composed of two gateways 3a and 3b, which are respectively connected to the line circuits 142 and 143 in the switchboard 1. The gateways 3a, 3b, and the IP extension terminals 4a, 4b, can be connected to each other through the LAN 2 by the LAN controller 33.

First of all, the IP addresses of the gateways 3a and 3b are supposed to be preliminarily registered in the line attribute table 123 of the switchboard 1 shown in FIG. 6 as shown in FIG. 10 as well as the following Table 1A as an example. Also, each IP address of the accommodated IP extension terminal is supposed to be preliminarily registered in a terminal management table 122 of the gateways 3a and 3b as shown in FIG. 10 and the following Table 1B as an example.

TABLE 1A

[LINE ATTRIBUTE TABLE] 123

| CLASSIFICATION: GW | |
| --- | --- |
| IP ADDRESS: 192.168.1.10 | ←REGISTERED INFORMATION OF GW 3a |
| CLASSIFICATION: GW | ←REGISTERED INFORMATION OF GW 3b |
| IP ADDRESS: 192.168.1.20 | |

TABLE 1B

[TERMINAL MANAGEMENT TABLE] 122

CLASSIFICATION: 3000
ACCOMMODATING LOCATION NO.:
(ACCOMMODATING LOCATION NO. OF GW 3a)
CLASSIFICATION: 3100
ACCOMMODATING LOCATION NO.:
(ACCOMMODATING LOCATION NO. OF GW 3b)

When a caller calls the IP extension terminal 4b from the IP extension terminal 4a, the IP extension terminal 4a sets the extension terminal No. "3000" of its own in the calling No. information of the session initialize message and the extension terminal No. "3100" of the destination IP extension terminal 4b in the called No. information of the session initialize message as an example of the session initialize message in FIG. 8 as shown in FIG. 10 and the following Table 2A. The IP extension terminal 4a notifies the extension terminal No. to the GW line controller 332 in the CPU 33 through the LAN controller 33 in the gateway 3a (at step S1 in FIG. 11).

It is to be noted that when receiving the session initialize message, the gateway 3a accepts a session initialize of step S1 to the IP extension terminal 4a. This similarly applies to the following session initialize processing.

TABLE 2A

[SESSION INITIALIZE MESSAGE
(IP EXTENSION TERMINAL 4a → GW 3a)]

CALL REFERENCE: 100
MESSAGE CLASSIFICATION: SESSION INITIALIZE
CALLING NO. INFORMATION ELEMENT: 3000
CALLED NO. INFORMATION ELEMENT: 3100

TABLE 2B

[SESSION INITIALIZE MESSAGE
(GW 3a→SWITCHBOARD)]

CALL REFERENCE: 10
MESSAGE CLASSIFICATION: SESSION INITIALIZE
CALLING NO. INFORMATION ELEMENT: 3000
CALLED NO. INFORMATION ELEMENT: 3100

The gateway 3a relays the session initialize message, shown in FIG. 10 and Table 2B, to the line controller 112 of the switchboard 1 not through the line circuits 31 and 142 without passing the GW line controller 332 and the CODEC 32 (at step S2).

In the switchboard 1, the call controller 111 having received the session initialize message from the line controller 112 retrieves the terminal management table 122 (Table 1B) with the called No. And recognizes from the accommodating location No. corresponding to the called party No. "3100" obtained by the retrieval that the IP extension terminal 4b is accommodated in the gateway 3b. And sets the called party extension terminal No. "3100" and the called party GW IP address "192.168.1.20" in the call management data 121 as shown in FIG. 10 and the following Table 3, as an example, of the call management data 121 shown in FIG. 4.

Also, the call controller 111 similarly sets the calling party extension terminal No. "3000" and the calling party GW IP address "192.168.1.10" of the call management data 121 from the calling No. information "3000".

TABLE 3

[CALL MANAGEMENT DATA] 121

CALLING CALL REFERENCE: 10
CALLING EXTENSION TERMINAL NO.: 3000
CALLING GW IP ADDRESS: 192.168.1.10
CALLED CALL REFERENCE: 20
CALLED EXTENSION TERMINAL NO.: 3100
CALLED GW IP ADDRESS: 192.168.1.20

The session initialize message is transmitted to the gateway 3b (at step S3) and is further transmitted from the gateway 3b to the called party IP extension terminal 4b (at step S4).

In response to this, the IP extension terminal 4b returns a ringing tone (ring back tone) to the calling party IP extension terminal 4a (at steps S5–S8).

When the IP extension terminal 4b is off-hooked thereafter, the response message is transmitted from the IP extension terminal 4b to the gateway 3b and the switchboard 1 (at steps S9 and S10).

In the switchboard 1, the call controller 111 having received the response message from the line controller 51 edits a non-standard information element 50 in the response reception message shown in the following Table 4A as an example of the message shown in FIG. 8.

TABLE 4A

[RESPONSE RECEPTION MESSAGE
(SWITCHBOARD→GW 3b)]

CALL REFERENCE: 20
MESSAGE CLASSIFICATION: RESPONSE RECEPTION
NON-STANDARD INFORMATION
ELEMENT CONTENTS
CONNECTING DESTINATION GW IP ADDRESS:
192.168.1.10
CONNECTING DESTINATION CALL REFERENCE: 10
CALLING/CALLED CLASSIFICATION: CALLED
CONNECTION CHANGEOVER CLASSIFICATION:
CHANGEOVER

TABLE 4B

[RESPONSE MESSAGE
(SWITCHBOARD→GW 3a)]

CALL REFERENCE: 10
MESSAGE CLASSIFICATION: RESPONSE
NON-STANDARD INFORMATION
ELEMENT CONTENTS
CONNECTING DESTINATION GW IP ADDRESS:
192.168.1.20
CONNECTING DESTINATION CALL REFERENCE:
20
CALLING/CALLED CLASSIFICATION: CALLING
CONNECTION CHANGEOVER CLASSIFICATION:
CHANGEOVER

Namely, "20" for the calling party call reference of the call management data 121, "192.168.1.10" for the calling party (connecting destination) GW IP address, "called party" for the called/calling classification, "changeover" for the connection changeover classification are respectively set as contents, which are transmitted to the gateway 3b (at step S11).

Also, the call controller 111 edits the non-standard information element 50 in the response message to the gateway 3a as shown in the above Table 4B, sets, as contents, "10" for the called party call No. of the call management data 121, "192.168.1.20" for the called party GW IP address, "calling party" for the called/calling classification, "changeover" for the connection changeover classification, and transmits them respectively (at step S12). The gateway 3a accepts the response for the switchboard 1 (at step S13).

Figure 7:
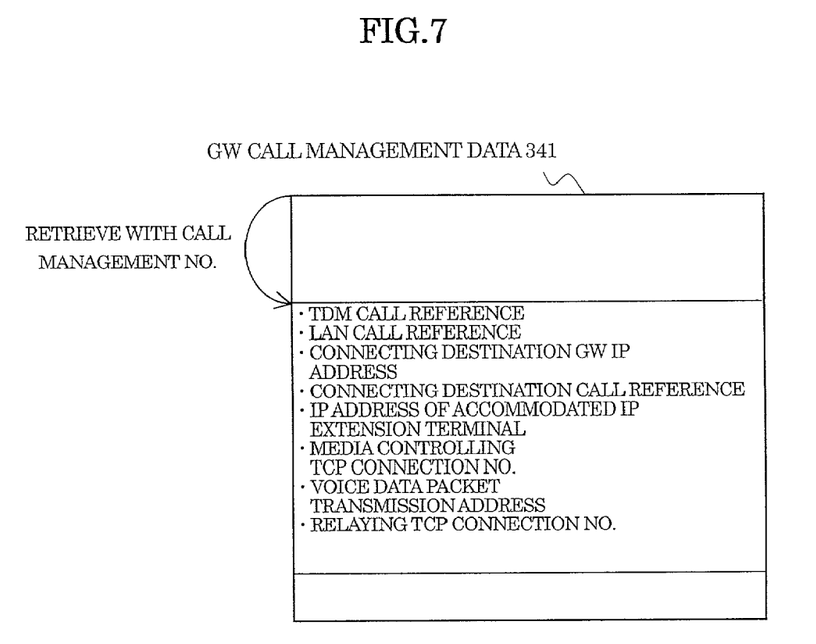
FIG. 7 is a detailed example of GW call management data 341 used in an embodiment of a voice data communication system according to the present invention.

In the gateway 3b, the GW call controller 331 having received the response reception message (Table 4A) from the GW line controller 332 determines the presence/absence of the non-standard information element 50 edited in the response reception message, and in the presence of the non-standard information element 50, sets the connecting destination GW IP address "192.168.1.10" and the connecting destination call reference "10" as shown in the following Table 5 as an example of the GW call management data 341 shown in FIG. 7.

TABLE 5

[GW CALL MANAGEMENT DATA OF GW 3b] 341

TDM CALL REFERENCE: 20
LAN CALL REFERENCE: 200
CONNECTING DESTINATION GW IP ADDRESS: 192.168.1.10
CONNECTING DESTINATION CALL REFERENCE: 10
IP ADDRESS OF ACCOMMODATED IP EXTENSION TERMINAL:
192.168.1.200
MEDIA CONTROLLING TCP CONNECTION NO.: —
VOICE DATA PACKET TRANSMISSION ADDRESS: —
RELAYING TCP CONNECTION NO.: —

The GW call controller 331 further checks the connecting destination IP address. When it is different from the IP address of its own and the classification of called/calling is "called party", waits a communication request from the connecting destination gateway 3a by using the LAN communication controller 334.

In the gateway 3a, the GW call controller 331 having received the response message (Table 4B) from the GW line controller 332 determines the presence/absence of the non-standard information element 50 edited in the form of a response message. In the presence of the non-standard information element 50, the GW call controller 331 sets the connecting destination GW IP address "192.168.1.20" and the connecting destination call reference "20" in the GW call management data 341 as shown in the following Table 6, and transmits the response message to the IP extension terminal 4a (at step S14). The above-mentioned description is a call control signal sequence.

TABLE 6

[GW CALL MANAGEMENT DATA OF GW 3a] 341

TDM CALL REFERENCE: 10
LAN CALL REFERENCE: 100
CONNECTING DESTINATION GW IP ADDRESS: 192.168.1.20
CONNECTING DESTINATION CALL REFERENCE: 20
IP ADDRESS OF ACCOMMODATED IP EXTENSION TERMINAL:
192.168.1.100
MEDIA CONTROLLING TCP CONNECTION NO.: 16
VOICE DATA PACKET TRANSMISSION ADDRESS: —
RELAYING TCP CONNECTION NO.: —

Then, the GW call controller 331 checks the IP address of the connecting destination in order to execute the media control signal sequence. When it is different from that of the GW call controller 331 itself and the called/calling classification is "calling party", the GW call controller 331 requests the TCP connection establishment with the connecting destination gateway 3b by using the LAN communication controller 334.

Also, when the TCP connection establishment request is received from the IP extention terminal 4a before the TCP connection with the gateway 3b is established (at step S15), the LAN communication controller 334 of the gateway 3a notifies the TCP connection No. "16" to the GW call controller 331 after the TCP connection establishment with the IP extension terminal 4a.

The GW call controller 331 sets the notified TCP connection No. "16" as the media controlling TCP connection No. of the GW call management data 341 as shown in the following Table 7A. The ability information setting message shown in Table 7B as an example of the message shown in FIG. 9 received from the IP extension terminal 4a at the same time (at step S16) is accumulated in the message accumulating buffer 342. The voice encoding rule etc. are set based on this ability information setting message.

TABLE 7A

[GW CALL MANAGEMENT DATA OF GW 3a] 341

TDM CALL REFERENCE: 10
LAN CALL REFERENCE: 100
CONNECTING DESTINATION GW IP ADDRESS:
192.168.1.20
CONNECTING DESTINATION CALL REFERENCE: 20
IP ADDRESS OF ACCOMMODATED IP EXTENSION TERMINAL:
192.168.1.100
MEDIA CONTROLLING TCP CONNECTION NO.: 16
VOICE DATA PACKET TRANSMISSION ADDRESS: —
RELAYING TCP CONNECTION NO.: 18

TABLE 7B

[ABILITY INFORMATION SETTING MESSAGE]

MESSAGE CLASSIFICATION:
ABILITY INFORMATION SETTING REQUEST
NON-STANDARD DATA: 10
CODER CLASSIFICATION: G.711, G.729

When the TCP connection with the gateway 3b is further established (at step S17), the route change is executed and the LAN communication controller 334 of the gateway 3a notifies the TCP connection No. "18" to the GW call controller 331. The GW call controller 331 sets the notified TCP connection No. "18" as the relaying TCP connection No. of the GW call management data 341 shown in the above Table 7A.

The GW call controller 331 edits the TDM side call reference "10" of the GW call management data 341 in the non-standard data as the connection source call reference to the ability information setting message (Table 7B) firstly received from the IP extension terminal 4a (at step S16) and transmits the data to the gateway 3b through the TCP connection (at step S18).

The LAN communication controller 334 receives the TCP connection establishment with the gateway 3a (at step S17), and the gateway 3b notifies the TCP connection No."19" to the GW call controller 331. The GW call controller 331 of the gateway 3b having received the ability information setting message by this TCP connection (at step S18) searches a call to which the connection changeover is performed by retrieving the connecting destination call reference of the GW call management data 341 shown in the following Table 8A with the connection source call No. "10" of the non-standard data within the message being made a key. The GW call controller 331 sets the notified TCP connection No. "19" to the relaying TCP connection No. of the concerned call.

TABLE 8A

[GW CALL MANAGEMENT DATA OF GW 3b] 341

TDM CALL REFERENCE: 20
LAN CALL REFERENCE: 200
CONNECTING DESTINATION GW IP ADDRESS: 192.168.1.10
CONNECTING DESTINATION CALL REFERENCE: 10
IP ADDRESS OF ACCOMMODATED IP EXTENSION TERMINAL: 192.168.1.200
MEDIA CONTROLLING TCP CONNECTION NO.: 17
VOICE DATA PACKET TRANSMISSION ADDRESS: —
RELAYING TCP CONNECTION NO.: 19

TABLE 8B

[ABILITY INFORMATION SETTING MESSAGE]

MESSAGE CLASSIFICATION:
ABILITY INFORMATION SETTING REQUEST
CODER CLASSIFICATION: G.711, G.729

The GW call controller 331 further requests the LAN communication controller 334 to establish the TCP connection with the IP extension terminal 4b (at step S19). The LAN communication controller 334 notifies the TCP connection No. "17" to the GW call controller 331 after establishing the TCP connection with the IP extension terminal 4b.

The GW call controller 331 sets the notified TCP connection No. "17" in the media controlling TCP connection No. of the GW call management data 341 in Table 8A. The GW call controller 331 removes the non-standard data from the ability information setting message (Table 7B) received from the gateway 3a, and transmits the ability information setting message shown in the above Table 8B to the IP extension terminal 4b through the media controlling TCP connection (at step S20).

Hereafter, the media control message from the IP extension terminal 4a or 4b is transmitted/received through the relaying TCP TCP connection whose route is changed.

Thus, the media control (a determination of an encoding method, a notification of the voice data packet reception address, etc.) is directly performed between the IP extension terminals 4a and 4b through the LAN 2.

As for a master/slave determination by the above-mentioned ability information setting message and an establishment of a logical channel, a well-known sequence in accordance with ITUT H.245 is used.

Namely, the IP extension terminal 4b receives the ability information setting message from the IP extension terminal 4a and communicates the ability information setting message (at step S21), thereby mutually notifying their abilities between the extension terminals 4a and 4b, and determining which of them should be a master or a slave (at steps S22–S23). Based on the determination, the logical channel of the LAN 2 is established (at steps S24–S25).

Thus, it becomes possible to directly transmit/receive the voice data packet between the IP extension terminals 4a and 4b through the LAN 2 (at steps S26–S27).

Hereinafter, how to change a route on which the voice data packet is directly transmitted/received between the IP extension terminals 4a and 4b into a route on which the packet is transmitted/received through the gateways 3a and 3b will be described.

Figure 12:
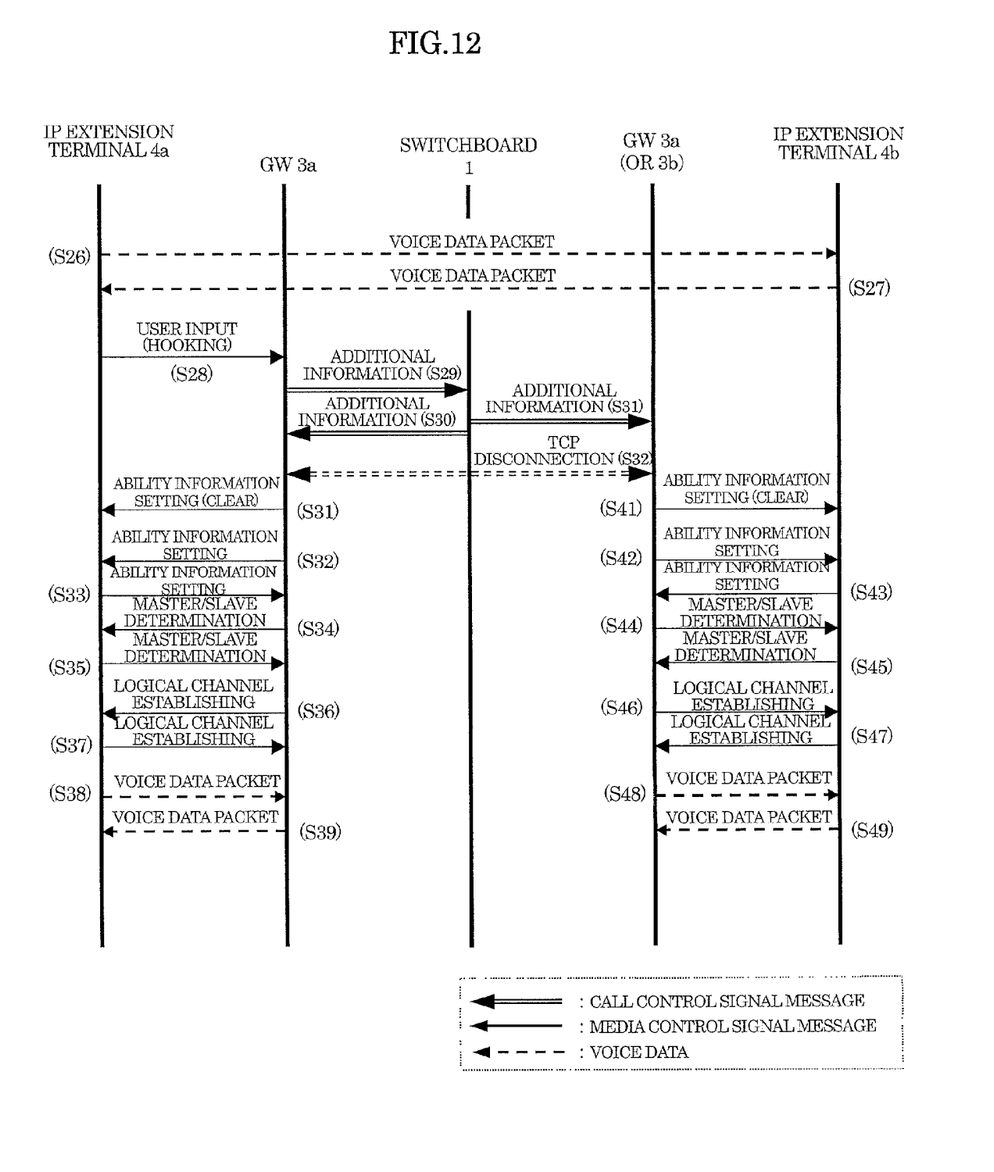
FIG. 12 is a sequence diagram (changeback) used in an embodiment of a voice data communication system according to the present invention.

FIG. 12 shows a message sequence example of an embodiment in which the hooking operation is performed at the IP extension terminal 4a side (at step S28 of FIG. 12) and the route is changed to one through the gateways 3a and 3b when the voice data packet is transmitted/received (at steps S26 and S27 of FIG. 11) in the voice data communication system according to the present invention.

A user input message of the IP extension terminal 4a is shown in the following Table 9A, and an additional information message shown in the following Table 9B indicating that the hooking operation is performed by the IP extension terminal 4a from the gateway 3a is transmitted to the switchboard 1 (at step S29).

TABLE 9A

[USER INPUT MESSAGE
(BETWEEN IP EXTENSION TERMINAL 4a-GW 3a)]

MESSAGE CLASSIFICATION: USER INPUT
SIGNAL TYPE: HOOKING

TABLE 9B

[ADDITIONAL INFORMATION MESSAGE
(GW 3a→SWITCHBOARD)]

CALL REFERENCE: 10
MESSAGE CLASSIFICATION: ADDITIONAL INFORMATION
USER · USER INFORMATION ELEMENT: HOOKING

In the switchboard 1, the call controller 111 edits a connection changeover classification of the non-standard information element 50 in the message to the additional information message set as "changeback" shown in the following Tables 10A and 10B, and the message is respectively transmitted to the gateways 3*a* and 3*b* (at steps S30 and S31).

TABLE 10A

[ADDITIONAL INFORMATION MESSAGE (SWITCHBOARD→GW 3a)]

CALL REFERENCE: 10
MESSAGE ClASSIFICATION:
ADDITIONAL INFORMATION
NON-STANDARD INFORMATION
ELEMENT CONTENTS
CONNECTING DESTINATION GW IP ADDRESS: 192.168.1.20
CONNECTING DESTINATION CALL REFERENCE: 20
CALLING/CALLED CLASSIFICATION: CALLING
CONNECTION CHANGEOVER CLASSIFICATION:
CHANGEBACK

TABLE 10B

[ADDITIONAL INFORMATION MESSAGE (SWITCHBOARD→GW 3b)]

CALL REFERENCE: 20
MESSAGE CLASSIFICATION:
ADDITIONAL INFORMATION
NON-STANDARD INFORMATION
ELEMENT CONTENTS
CONNECTING DESTINATION GW IP ADDRESS: 192.168.1.10
CONNECTING DESTINATION CALL REFERENCE: 10
CALLING/CALLED CLASSIFICATION: CALLED
CONNECTION CHANGEOVER CLASSIFICATION:
CHANGEBACK

When recognizing that the connection changeover classification of the non-standard information element 50 is turned to "changeback", the GW call controller 331 of the gateway 3*a* having received the above-mentioned additional information message instructs the LAN communication controller 334 to disconnect the TCP connection corresponding to the relaying TCP connection No. of the GW call management data 341 and executes the disconnection of the TCP connection (at step S32).

The media control information determined (at steps S21–S25 of FIG. 11) between the IP extension terminals 4*a* and 4*b* by the ability information setting message shown in the following Table 11 is cleared for the IP extension terminal 4*a*, and the media control information is determined between the gateway 3*a* and the IP extension terminal 4*a* (at steps S31–S39 of FIG. 12). The same operation is performed to the gateway 3*b* (at steps S41–S49).

The gateways 3*a* and 3*b* transmit/receive the voice data packet in the route via the switchboard 1 as well as the prior art shown in FIG. 13.

TABLE 11

[ABILITY INFORMATION SETTING MESSAGE]

MESSAGE CLASSIFICATION: ABILITY INFORMATION SETTING REQUEST
CODER CLASSIFICATION: 0 (CLEAR)

Hereinafter, the processing of the invention (2) will be described.

When the IP extension terminal 4*b* is accommodated in the gateway 3*a*, namely both of the IP extension terminals 4*a* and 4*b* are accommodated in the same gateway 3*a* (when the gateway is a single, and both gateways are the gateways 3*a* in FIG. 11), the GW call controller 331 of the gateway 3*a* recognizes the loopback connection in the own apparatus at step S11 in FIG. 11 since the determination of the connecting destination GW IP address of the response reception message (at step S12 of FIG. 11) shown in the following Table 12 coincides with its own IP address "192.168.1.10".

TABLE 12

[RESPONSE ACCEPTTING MESSAGE]

CALL REFERENCE: 20
MESSAGE CLASSIFICATION: ACCEPT RESPONSE
NON-STANDARD INFORMATION ELEMENT CONTENTS
CONNECTING DESTINATION GW IP ADDRESS: 192.168.1.10
CONNECTING DESTINATION CALL REFERENCE: 10
CALLING/CALLED CLASSIFICATION: CALLED
CONNECTION CHANGEOVER CLASSIFICATION: CHANGEOVER

The GW call controller 331 determines the relay destination of the media control message by the media controlling TCP connection No. of the connecting destination based on the connecting destination call reference "10" of the called party GW call management data 341 shown in the following Table 13B.

Namely, the GW call management data 341 are provided with, as shown in Tables 13A and 13B, both of "the calling party" and "the called party".

TABLE 13A

[GW CALL MANAGEMENT DATA (CALLING) OF GW 3a] 341

TDM CALL REFERENCE: 10
LAN CALL REFERENCE: 100
CONNECTING DESTINATION GW IP ADDRESS: —
CONNECTING DESTINATION CALL REFERENCE: —
IP ADDRESS OF ACCOMMODATED IP EXTENSION TERMINAL: 192.168.1.100
MEDIA CONTROLLING TCP CONNECTION NO.: —
VOICE DATA PACKET TRANSMISSION ADDRESS: —
RELAYING TCP CONNECTION NO.: —

TABLE 13B

[GW CALL MANAGEMENT DATA (CALLED) OF GW 3a] 341

TDM CALL REFERENCE: 20
LAN CALL REFERENCE: 200
CONNECTING DESTINATION GW IP ADDRESS: 192.168.1.10
CONNECTING DESTINATION CALL REFERENCE: 10
IP ADDRESS OF ACCOMMODATED IP EXTENSION TERMINAL: 192.168.1.200
MEDIA CONTROLLING TCP CONNECTION NO.: —
VOICE DATA PACKET TRANSMISSION ADDRESS: —
RELAYING TCP CONNECTION NO.: —

The other processing is performed in the same way as the above-mentioned present invention (1).

As described above, the present invention is arranged such that when recognizing communication between interworking units, a switchboard notifies the communication between interworking units to the interworking units, which are provided corresponding to each of IP extension terminals, and establish a relay route to the interworking unit according to a notification from the switchboard and establish a voice data packet route to a route between the IP extension terminals through the network by using the relay route in response to a route establishment request from the IP extension terminals accommodated, or when the interworking unit is a single and the notification is received from the switchboard, establish a voice data packet route to a route between the IP extension terminals through the network according to a route establishment request from the IP extension terminal accommodated. Therefore, it becomes possible to directly transmit/receive the voice data packet between the IP extension terminals, which leads to an effect of making a delay time shorter than that of the prior art voice data communication system since a dispersion in the gateway is not absorbed.

Also, it becomes possible to directly transmit/receive the voice data packet between the IP extension terminals, which leads to an effect of improving a voice quality better than the prior art voice data communication system since a compression-coding and a decompression-decoding are not performed in the gateway.

Furthermore, it becomes possible to directly transmit/receive the voice data packet between the IP extension terminals, which leads to an increase of a bandwidth use efficiency of the network since the voice data packet transmission is not performed in the gateway and a bandwidth on the network necessary for the voice data packet becomes half of the prior art voice data communication system.

We claim:

1. A voice data communication system comprising:
   a switchboard for switching lines;
   a network;
   interworking units for interworking a protocol on the network with a protocol for a line switching; and
   IP extension terminals connected to the interworking units through the network;
   the switchboard having a recognition unit for recognizing a communication to be made between the interworking units, and a notification unit for notifying the communication to the interworking units when the communication is recognized, and
   each of the interworking units, provided corresponding to each of the IP extension terminals, having a relay route establishing unit for establishing a relay route to the interworking unit according to a notification from the switchboard, and a route establishing unit for establishing a voice data packet route to a route between the IP extension terminals through the network by using the relay route in response to a route establishment request from the IP extension terminals accommodated.

2. The voice data communication system as claimed in claim 1 wherein when a hooking operation is performed in any of the IP extension terminals, the recognition unit of the switchboard recognizes the hooking operation through the interworking unit, and the notification unit notifies the hooking operation to the voice data packet route establishing units of the interworking units, whereby the voice data packet route establishing units disconnect the relay route and establish a new voice data packet route between the IP extension terminals respectively accommodated in the voice data packet route establishing units.

3. A voice data communication system comprising:
   a switchboard for switching lines;
   a network;
   interworking units for interworking a protocol on the network with a protocol for a line switching; and
   IP extension terminals connected to the interworking units through the network;
   the switchboard having a recognition unit for recognizing a communication to be made between the interworking units, and an notification unit for notifying the communication to the interworking units when the communication is recognized, and
   each of the interworking units having a route establishing unit for establishing a voice data packet route to a route between the IP extension terminals through the network according to a route establishment request from the IP extension terminal accommodated when the notification from the switchboard is received.

4. The voice data communication system as claimed in claim 1 wherein the recognition unit recognizes the communication between the interworking units by predetermined data preliminary registered and data determined at a time of a session initialization.

5. The voice data communication system as claimed in claim 1 wherein the route establishment request includes an ability information setting message.

6. The voice data communication system as claimed in claim 1 wherein the interworking unit comprises a gateway.

7. The voice data communication system as claimed in claim 1 wherein the network comprises a LAN or a WAN.

* * * * *